Figure 6:
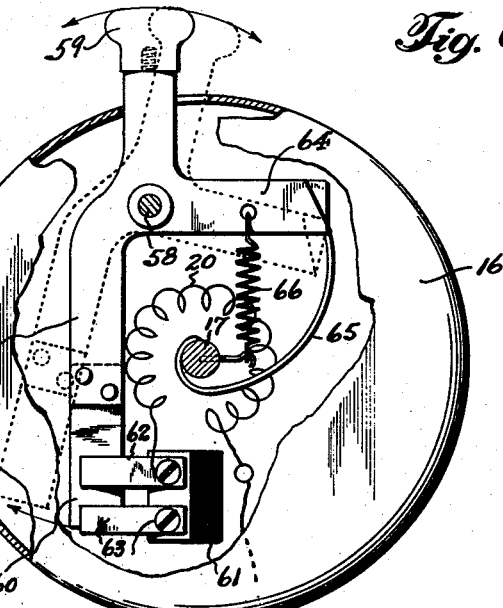

March 16, 1926.  
C. A. BREWER  
GENERATOR FOR STEAM PRESSING IRONS  
Filed April 29, 1925 5 Sheets-Sheet 1

1,576,568

INVENTOR  
Charles A. Brewer,  
BY  
Frantz and Richards,  
ATTORNEYS

March 16, 1926.
1,576,568
C. A. BREWER
GENERATOR FOR STEAM PRESSING IRONS
Filed April 29, 1925
5 Sheets-Sheet 2
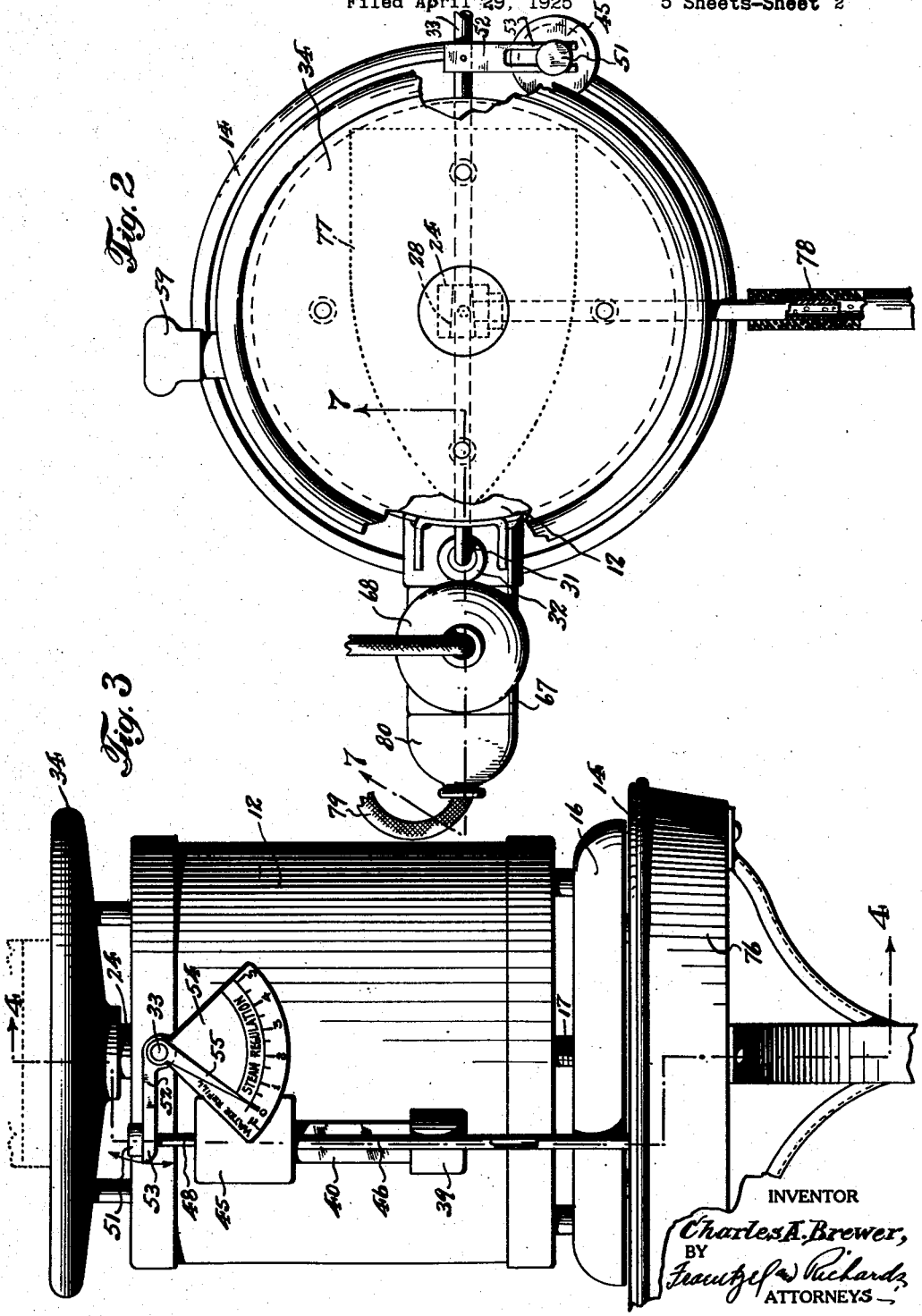
INVENTOR
Charles A. Brewer,
BY
ATTORNEYS

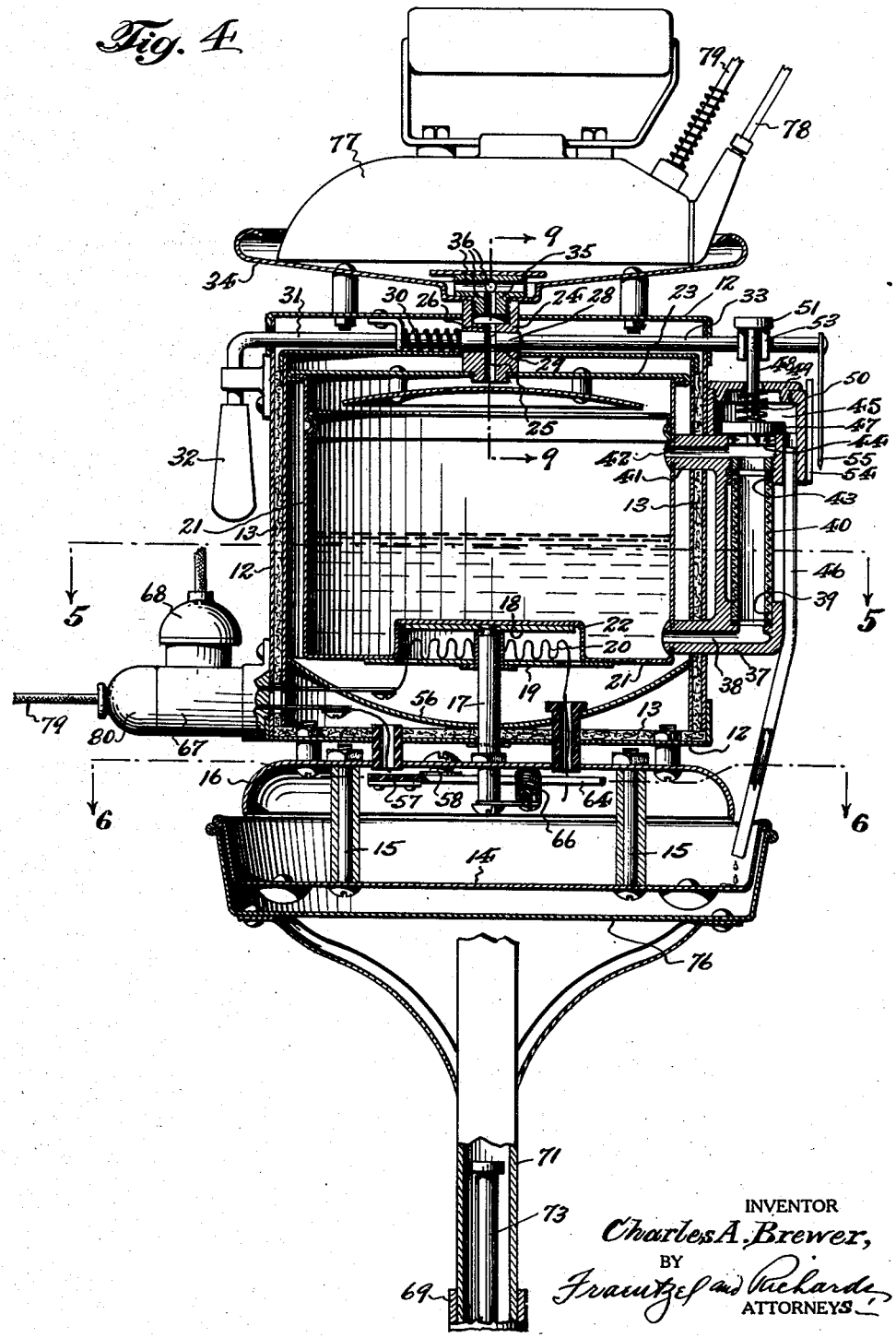

March 16, 1926.
C. A. BREWER
1,576,568
GENERATOR FOR STEAM PRESSING IRONS
Filed April 29, 1925
5 Sheets-Sheet 4
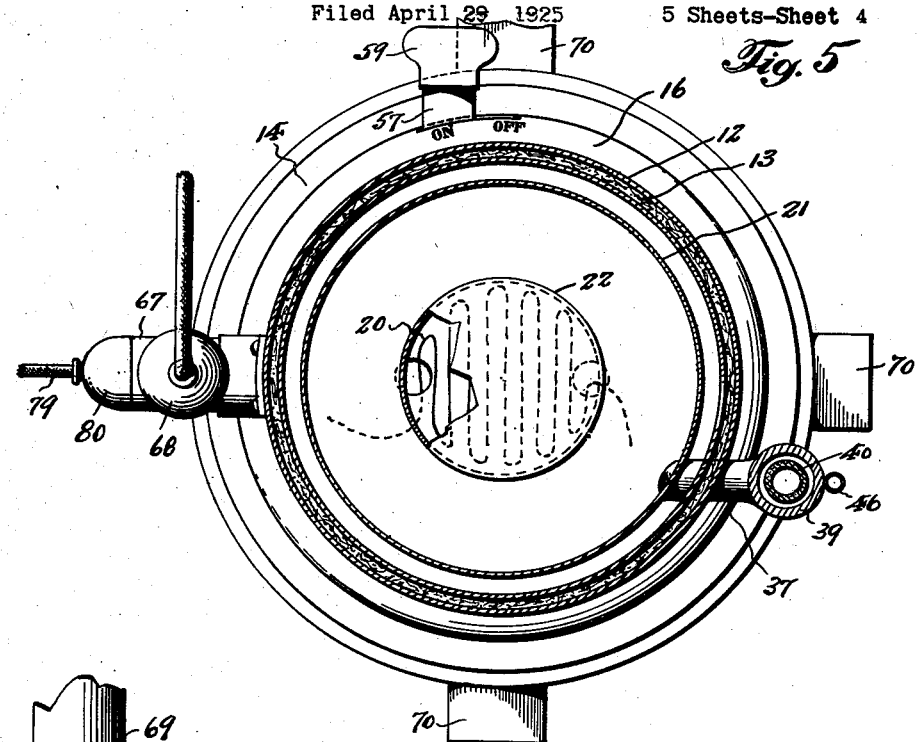
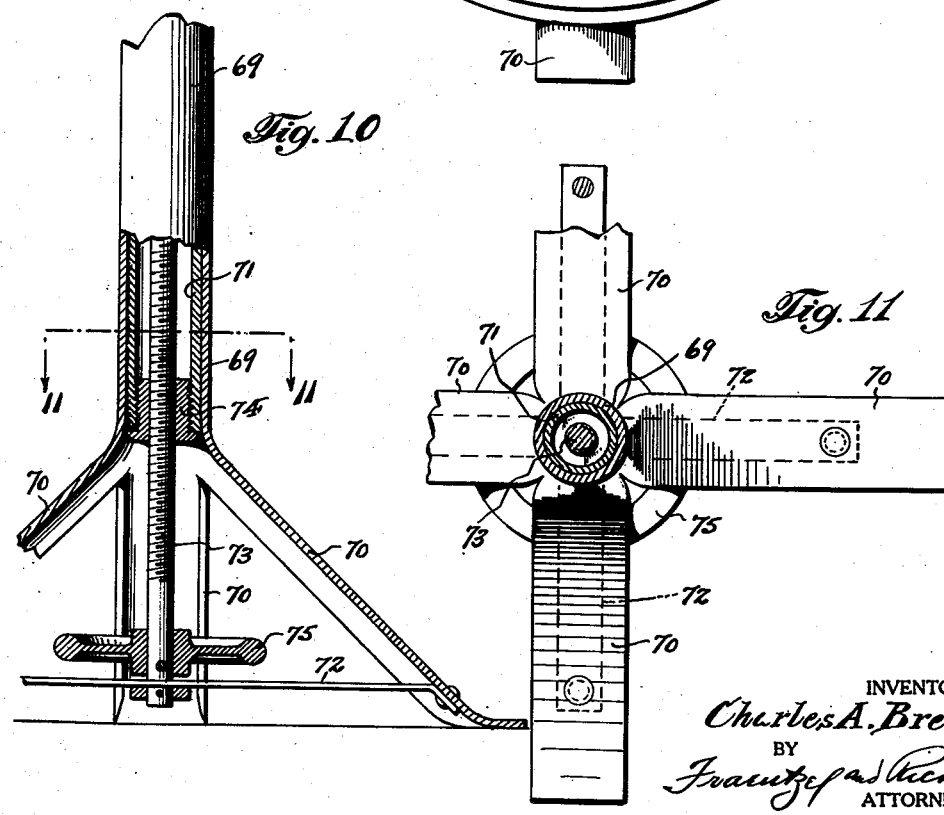
INVENTOR
Charles A. Brewer,
BY
Frantz and Richards
ATTORNEYS March 16, 1926.

C. A. BREWER

GENERATOR FOR STEAM PRESSING IRONS

Filed April 29, 1925  5 Sheets-Sheet 5

1,576,568

INVENTOR
Charles A. Brewer,
BY
Frautzel and Richards
ATTORNEYS

Patented Mar. 16, 1926.

1,576,568

UNITED STATES PATENT OFFICE.

CHARLES A. BREWER, OF NOROTON HEIGHTS, CONNECTICUT, ASSIGNOR TO CANNON ENGINEERING CO., OF BROOKLYN, NEW YORK, A CORPORATION OF NEW YORK.

GENERATOR FOR STEAM PRESSING IRONS.

Application filed April 29, 1925. Serial No. 26,606.

*To all whom it may concern:*

Be it known that I, CHARLES A. BREWER, a citizen of the United States, residing at Noroton Heights, in the county of Fairfield and State of Connecticut, have invented certain new and useful Improvements in Generators for Steam Pressing Irons; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to an improved generator or boiler for supplying steam; and the invention has reference, more particularly, to a combined steam generator and iron stand or support for use in connection with steam pressing irons for household or domestic use.

The invention has for its principal object to provide a portable steam generator and iron support for domestic use which is adapted to supply low pressure steam to steam pressing irons; and to this end the invention seeks to provide a simple form of steam boiler suitably supported upon a standard so that the same may be easily moved about and stored away when its use is not desired; the same having combined therewith a support for a steam iron which also serves as a filling funnel for the boiler chamber.

The invention has for a further object to provide in connection with the boiler per se a novel construction of combined safety valve, water level indicator and filling overflow, in connection with which there is also provided an overflow catch-basin.

Other objects of this invention, not at this time more particularly enumerated, will be clearly understood from the following detailed description of the same.

With the various objects of this invention in view the same consists, primarily, in the novel steam generator apparatus hereinafter set forth; and the invention consists, furthermore, in the several novel arrangements and combinations of the various devices and parts, as well as in the details of the construction of said parts, all of which will be hereinafter more fully described in the following specification, and then finally embodied in the claims appended thereto.

The invention is clearly illustrated in the accompanying drawings, in which:—

Figure 1:
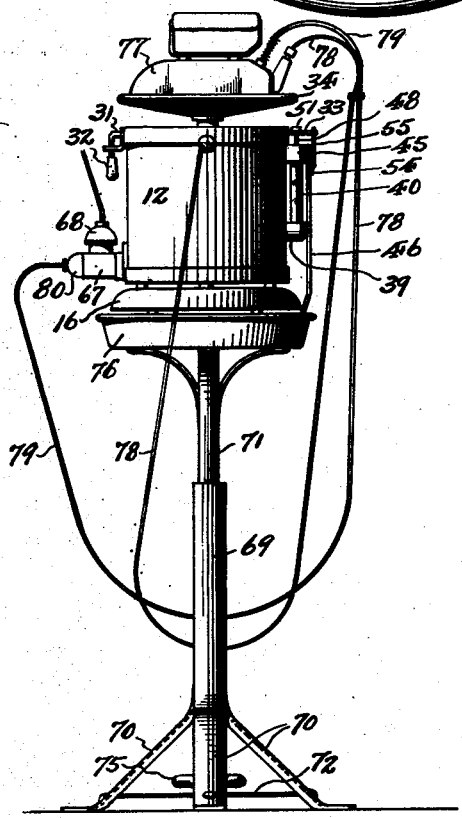
Figure 9:
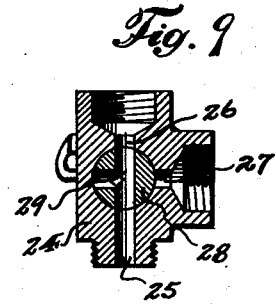
Figure 7:
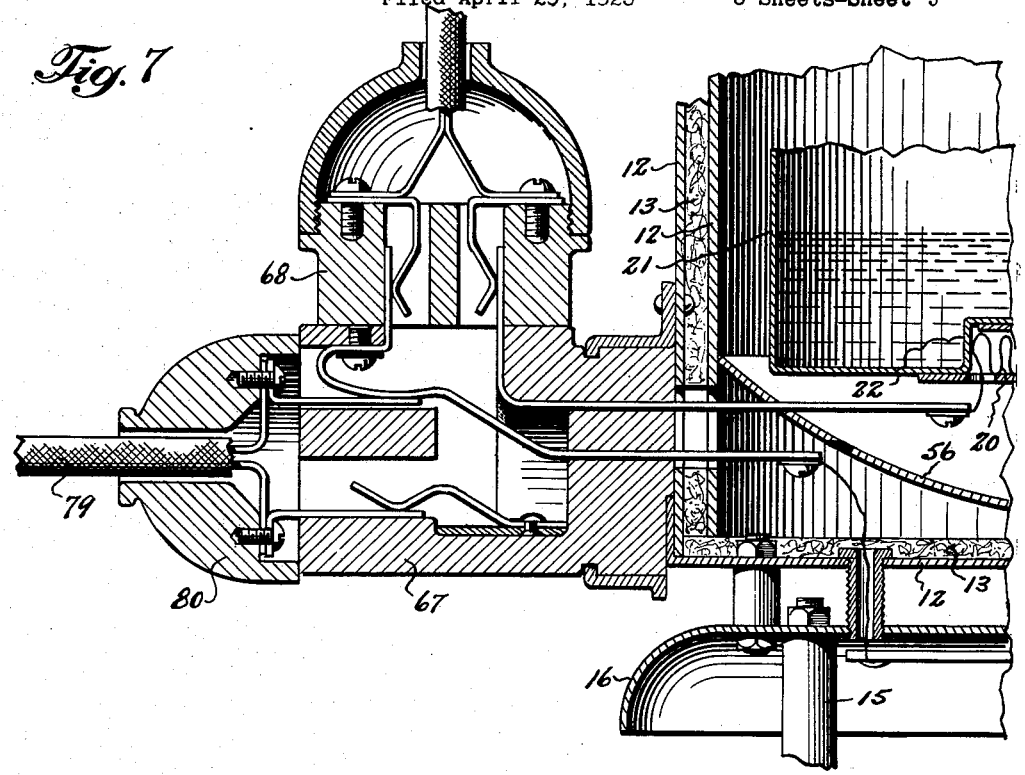
Figure 8:
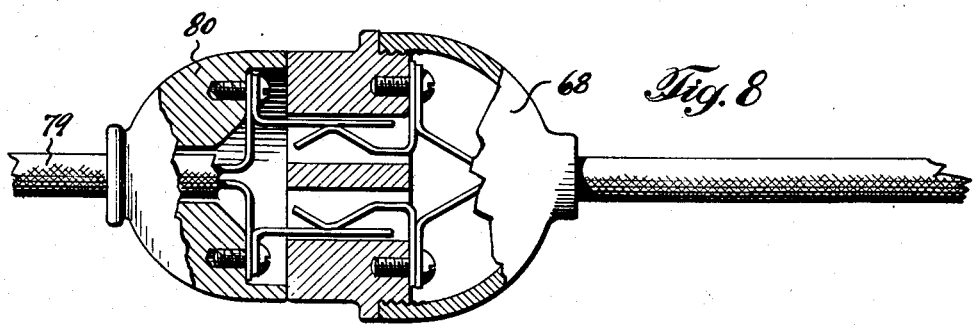

Figure 1 is a side elevation of the novel steam generator made according to and embodying the principles of this invention; Figure 2 is a top end view of the same, on an enlarged scale, Figure 3 is another side elevation of the same, on an enlarged scale, with the standard thereof partially broken away; Figure 4 is a vertical longitudinal section taken on line 4—4 in Figure 3; Figure 5 is a horizontal section, taken on line 5—5 in Figure 4; Figure 6 is a fragmentary horizontal section, taken on line 6—6 in Figure 4; Figure 7 is a somewhat enlarged fragmentary vertical section, taken on line 7—7 in Figure 2; Figure 8 is a detail view of the electric circuit coupling as disposed for direction connection with an iron; Figure 9 is an enlarged fragmentary section of the combined water filling and steam discharge valve of the boiler, taken on line 9—9 in Figure 4; Figure 10 is a fragmentary sectional view of the lower end of the standard support for the boiler; and Figure 11 is a horizontal section taken on line 11—11 in said Figure 10.

Similar characters of reference are employed in all of the hereinabove described views, to indicate corresponding parts.

Referring now to said drawings, the reference character 12 indicates an outer casing for enclosing the boiler proper, the same being preferably made of sheet metal provided with a lining 13 of heat insulation material, such as asbestos.

The reference character 14 indicates a drip pan or catch-basin. Supported upon upwardly extending posts 15, which are affixed to the bottom of said catch-basin 14, is an intermediate plate 16, which is preferably of smaller diameter than the diameter of the catch-basin. Said outer casing 12 is suitably secured to and supported above said intermediate plate 16. Centrally secured to said intermediate plate 16 is an upstanding stud 17, the upper free end of which extends through the bottom of said outer casing 12 and into the interior of the latter. Suitably secured to the upper free end of said stud 17 is a seating flange 18. Also suitably secured in connection with said stud 17 and spaced downwardly from the seating flange 18 is a second flange 19. The spaced flanges 18 and 19 provide an intermediate chamber in which may be disposed an electrical heating unit 20 of any desired form or construction. The reference character 21 indicates a boiler shell, which is provided in its bottom portion with an indented socket portion 22 which fits telescopically over the seating flange 18, thus both supporting the boiler shell 21 upon the stud 17 and at the same time closely associating the heating unit 20 with the bottom of said boiler shell.

Suitably coupled with the upper end wall 23 of said boiler shell 21 is a valve housing 24 of the two-way type, whereby the same is provided with a boiler communication port 25, a water intake port 26, and a steam discharge port 27. Extending transversely through said valve housing 24, and rotatably related thereto, is a valve-member 28 provided with a two-way valve port 29. The said valve-member is of longitudinally tapered form, and is retained in seated relation to the valve housing by a compression spring 30. Extending from one end of said valve member is a stem portion 31, the outer end of which is exteriorly projected at one side of said outer casing 12, said outer end having a handle portion 32 by means of which the valve member is manipulated. Extending from the opposite end of said valve member is an extension 33 of the stem portion, the outer end of which is exteriorly projected at the opposite side of said outer casing 12. The function of said stem extension 33 will be subsequently described.

The upper end of said valve housing 24 projects exteriorly above the upper wall of said outer casing 12. Suitably secured to and supported above the upper end wall of said outer casing 12 is a dished plate, which serves as a combined filling funnel and pressing iron support 34. The bottom of said combined funnel and support 34 is arranged to communicate with said water intake port 26 of said valve housing 24, a suitable intake fitting 35 provided with communicating passages or ducts 36 serving to operatively interconnect the former with the latter.

Operatively connected with said boiler shell 21 is a novel means adapted to serve as a combined safety valve, water level indicator or gauge, and filling overflow, the same comprising a suitable fitting having a laterally extending lower arm 37, which extends through said outer casing 12 into connection with said boiler shell 21, said arm 37 having a passage 38 leading from the interior of said boiler shell 21, at a point below normal water level therein, to a lower socket portion 39 in which is fixed the lower end of a transparent tubular gauge glass 40. Said fitting is further provided with a laterally extending upper arm 41, which also extends through said outer casing 12 into connection with said boiler shell 21, said arm 41 having a passage 42 leading from the interior of said boiler shell 21, at a point above normal water level therein, to an upper socket portion 43 in which is fixed the upper end of said transparent tubular gauge glass 40. Said fitting is further provided, above and in communication with said passage 42, with a valve-port 44 which communicates at its upper or outer side with a discharge chamber 45. Coupled in communication with said discharge chamber 45 is a discharge pipe 46 which extends downwardly therefrom, with its free lower end entered into the drip-pan or catch-basin 14. Cooperating with the upper or outer side of said valve-port 44 is a valve-disk 47, the stem 48 of which extends upwardly through said discharge chamber 45 to project exteriorly through and above a top-cap 49 threaded into the upper wall of said discharge chamber 45. A compression spring 50 disposed around said stem 48, between said top-cap 49 and valve-disk 47 yieldably holds the latter in closed relation to said valveport 44. Said valve-stem 48 is provided at its exterior free end with a head 51 of enlarged diameter. Fixed on said stem extension 33 is a lift cam 52 provided at its free end with a bifurcated portion or fork 53 which straddles said valve-stem 48 beneath said head 51.

Secured to the exterior side of said discharge chamber 45 is an indicator plate 54, the face of which bears indicating characters, one designating the neutral closed position of the valve-member 28, to the left of which is a designation denoting the water filling position of the valve-member 28, and to the right of which are various graduated designations for denoting the degree of steam discharge position of the valve member 28. Secured on the outer free end of said valve stem extension 33 is a pointer or indicator hand 55 which cooperates with and moves over the face of said indicator plate 54 accordingly as the valve member 28 is manipulated.

Arranged below said boiler shell 21, intermediate the bottom thereof and the associated heating unit 20 and the bottom of said outer casing 12 is a concavo-convex heat reflector plate 56.

A suitable cut-out switch means is connected in circuit with the heating unit 20. Preferably this switch means comprises a lever 57 pivoted on a fulcrum stud 58 beneath said plate 16. The outer end of said lever projects beyond the periphery of said plate 16 and is provided with a handle portion 59. Said lever is preferably made of a suitable electrically non-conductive material, and connected with the inner end of said lever is a knife-blade contact 60. Secured to said plate 16 is a block of insulation material 61, upon which are mounted a pair of separated contacts 62 and 63 engageable by said knife-blade contact 60, when the switch is closed. If desired said lever 57 may be provided with a lateral extension or arm 64, engageable by a thermostatic detent member 65 for holding the switch lever in circuit closing relation to the contacts 62 and 63, said thermostatic detent being anchored on the lower end of said stud 17. A pull-spring 66 is interconnected between said switch extension or arm 64 and the lower end of said stud 17 to move the switch lever to circuit breaking position when relieved from the restraint of said detent member 65. The heating unit 20 is connected in series with the contacts 62 and 63, through suitable separable electrical coupling devices 67 and 68, through which current is delivered from any convenient service circuit.

The novel steam generator, thus above described in detail, is mounted on a supporting standard, so that the same can be readily moved about, and so that the same may be conveniently located relative to the place of use of a steam pressing iron to which the generator is to supply steam. In preferred form the supporting standard is of a vertically adjustable type, so that the steam generator may be supported at a desired height or level. To this end the standard comprises a stationary tubular lower column 69, having at its lower end outwardly and downwardly extending radial foot-pieces 70, and a vertically movable tubular upper column 71 telescopically slidable in the upper end of said lower column 69. Rotatably connected by its lower end with a crosspiece or support 72 which extends transversely between and is fixed to said foot-pieces 71 is an adjusting screw 73 which extends upwardly through said lower column 69. Fixed in the lower end of said upper column 71 is a nut-piece 74 through which said adjusting screw 73 is threaded. A hand-wheel 75 is fixed to said adjusting screw 73, whereby the same may be turned in one direction or the other to thereby cause the nut-piece 74 to travel up or down the adjusting screw 73 with a consequent raising or lowering of the upper column 71, as may be desired. Suitably affixed to and supported by the upper free end of said upper column 71 is a flanged supporting plate 76 which receives and embraces the drip-pan or catch-basin 14, and thus supports the steam generator as a whole, all as shown in Figures 1, 4, 5, 10 and 11 more particularly.

The reference character 77 indicates a steam-pressing iron, of the general type which is adapted to discharge from its pressing face the steam which was delivered thereto during the pressing operations, to thus moisten the goods or articles undergoing such pressing operations. Suitably connected with the steam discharge port 27 of the valve housing 24, is a flexible steam conduit 78, the outer free end of which is suitably connected in operative relation to the steam iron 77.

The most practical type of steam pressing iron is one which is electrically heated. I have therefore shown a practical means for connecting the electrical service cable 79 of the iron with the service circuit by means of a coupling plug 80 which also cooperates with the coupling member 67 so that the iron is connected in shunt circuit with the boiler heating unit 20. If desired, the coupling plugs 80 and 68 may be so constructed, that when disconnected from the coupling member 67, the same may be directly united (as shown in Figure 8) to thus discontinue the supply of current to the boiler heating unit, while nevertheless continuing the service of current to the pressing iron.

When it is desired to make use of the steam generator as a source of steam supply to the pressing iron 77, water is first introduced into the boiler shell 21. This may be accomplished as follows:—

The valve 28 is turned, by means of the stem 31 and its handle 32, until the indicator hand 55 registers with the water filling designation of the indicator plate 54. By such manipulation the valve port 29 of said valve 28 is brought into open or communicating position intermediate the boiler communication port 25 and the water intake port 26 (as shown in Figure 9). The movement of the valve 28 to the above described position actuates the lifting cam 52 to raise the head 51 and stem 48 to thereby lift the valve-disk 47 from closed relation to the valve-port 44, thus opening communication between the interior of the boiler shell 21 and the discharge chamber 45. With the parts in the above described positions, water is poured into the funnel 34 to pass thence through the open valve 28 into the interior of said boiler shell 21. The open valve port 44 provides a means for the escape of the air from the interior of the boiler shell 21 which is displaced by the water thus introduced into the latter. The open valve port 44 also provides a water overflow exit to prevent over-supplying the boiler, since as the water level rises to the passage 42, the water will flow outwardly therethrough, and thence into the discharge chamber 45 through the open valve port 44, to be carried thence by the discharge pipe 46 down into the catch-basin or drip-pan 14.

After the boiler shell 21 has been supplied with water, the valve 28 is returned to closed position, and the boiler device, as supported on its stand, is moved to the place it is desired to make use of the iron to be supplied with steam generated therein. In this connection it will be understood that the stand, by reason of its vertical adjustability, may be arranged to support the boiler at a convenient height adjacent to an ironing board, while at the same time at such a level that the funnel member 34 may be utilized as a rest or support for the iron 77 in the interim between pressing operations. The electrical connections being established between the boiler and iron so as to supply electric current to their respective heating elements, the switch 57 is moved to circuit closing position so that the boiler heating unit 20 is energized. Heat being thus applied to the boiler, the water supplied thereto is brought to a boil so that steam is produced within the boiler chamber. The valve 47 is returned to normally closed position, when the valve 28 is in either closed or in steam discharging condition, and said valve 47 is yieldably held in such closed position by the spring 50, so that the same, under such circumstances will function as a poppet safety valve to relieve any undue steam pressure within the boiler shell 21.

To discharge steam from the boiler shell 21 into the iron 77 for extravasation from the pressing face of the latter, the valve 28 is turned to bring its valve port 29 into intercommunicating position intermediate the boiler communication port 25 and the steam discharge port 27, the indicator hand 55 registering on the indicator plate 54 the degree of steam discharge opening of the valve 28. Steam is thereupon discharged from the boiler shell 21 to flow through the flexible delivery conduit 78 into the steam chamber of the iron 77, so that as the pressing operations are carried out by the latter, the goods being pressed will be dampened by the extravasation of the steam from the pressing face of the iron.

From the above description it will be quite apparent that a novel combined portable steam generator and supporting stand therefor is provided which is peculiarly adapted for use in connection with steam pressing irons, and which is especially suitable for service in connection with domestic or household use of steam pressing irons. The steam generator per se is simple in construction, safe and easily manipulated, and the combined filling funnel and iron support or rest feature thereof is of advantage since it serves also to catch any condensation or drip from the pressing iron.

I am aware that some changes may be made in the general arrangements and combinations of the various devices and parts, as well as in the details of the construction of the same, without departing from the scope of this invention as described in the foregoing specification, and as defined in the appended claims. Hence, I do not limit my invention to the exact arrangements and combinations of the devices and parts as set forth in the foregoing specification, nor do I confine myself to the exact details of the construction of said parts as illustrated in the accompanying drawings.

I claim:—

1. A portable steam generator for the purposes described, comprising a boiler body, heating means therefor, means for supporting the boiler body, a combined filling funnel and iron rest at the upper end of said boiler body, and a valve means intermediate said boiler body and filling funnel manipulatable to establish at will either water intake communication between the latter and the former or steam discharge from the boiler interior.

2. A portable steam generator for the purposes described, comprising a boiler body, electrical heating means therefor, an overflow catch-basin connected with the lower end of said boiler body and from which the latter is supported, a filling over-flow means in communication with the interior of said boiler body, a discharge pipe leading from said over-flow means to said catch-basin, a spring pressed valve to close said over-flow means, said valve serving when in closed position as a safety valve yieldable to excess steam pressure within the boiler body, means for filling the boiler body with water, and means to open said valve when filling the boiler body.

3. A portable steam generator for the purposes described, comprising a boiler body, electrical heating means therefor, an overflow catch-basin connected with the lower end of said boiler body and from which the latter is supported, a filling over-flow means in communication with the interior of said boiler body, a discharge pipe leading from said over-flow means to said catch-basin, a spring pressed valve to close said over-flow means, said valve serving when in closed position as a safety valve yieldable to excess steam pressure within the boiler body, means for filling the boiler body with water, means to open said valve when filling the boiler body, and a vertically adjustable standard having a supporting plate at its upper end to receive and support said catch basin and the boiler body connected therewith.

4. A portable steam generator for the purposes described, comprising a boiler body having an enclosing heat insulating outer casing, an electrical heating means cooperating with the lower end of said boiler body and placed within said outer casing, means for supporting said boiler body and its outer casing, a combined filling funnel and iron rest at the upper end of said outer casing, and a valve means intermediate said boiler body and filling funnel manipulatable to establish at will either water intake communication between the latter and the former or steam discharge from the boiler interior.

5. A portable steam generator for the purposes described, comprising a boiler body having an enclosing heat insulating outer casing, an electrical heating means cooperating with the lower end of said boiler body and placed within said outer casing, means for supporting said boiler body and its outer casing, a combined filling funnel and iron rest at the upper end of said outer casing, a valve means intermediate said boiler body and filling funnel manipulatable to establish at will either water intake communication between the latter and the former or steam discharge from the boiler interior, and a combined safety valve-water level indicator and filling over-flow in communication with said boiler interior.

6. A portable steam generator for the purposes described, comprising a boiler body having an enclosing heat insulating outer casing, an electrical heating means cooperating with the lower end of said boiler body and placed within said outer casing, an overflow catch-basin connected with the lower end of said boiler body and its outer casing, a combined filling funnel and iron rest at the upper end of said outer casing, a valve means intermediate said boiler body and filling funnel manipulatable to establish at will either water intake communication between the latter and the former or steam discharge from the boiler interior, a filling over-flow means in communication with the boiler interior, a discharge pipe leading from said over-flow means to said catch-basin, a spring pressed valve to close said over-flow means, said valve serving when in closed position as a safety valve yieldable to excess steam pressure within the boiler body, and means cooperating with said first mentioned valve for raising said spring pressed valve to open position when the former is moved to water admission position.

7. A portable steam generator for the purposes described, comprising a boiler body having an enclosing heat insulating outer casing, an electrical heating means cooperating with the lower end of said boiler body and placed within said outer casing, an over-flow catch-basin connected with the lower end of said boiler body and its outer casing, a combined filling funnel and iron rest at the upper end of said outer casing, a valve means intermediate said boiler body and filling funnel manipulatable to establish at will either water intake communication between the latter and the former or steam discharge from the boiler interior, a filling over-flow means in communication with the boiler interior, a discharge pipe leading from said over-flow means to said catch-basin, a spring pressed valve to close said over-flow means, said valve serving when in closed position as a safety valve yieldable to excess steam pressure within the boiler body, means cooperating with said first mentioned valve for raising said spring pressed valve to open position when the former is moved to water admission position, and a vertically adjustable standard having a supporting plate at its upper end to receive and support said catch-basin and the boiler body connected therewith.

8. A portable steam generator for the purposes described, comprising a boiler body having an enclosing heat insulating outer casing, an electrical heating means cooperating with the lower end of said boiler body and placed within said outer casing, an overflow catch-basin connected with the lower end of said boiler body and its outer casing, a combined filling funnel and iron rest at the upper end of said outer casing, a valve means intermediate said boiler body and filling funnel manipulatable to establish at will either water intake communication between the latter and the former or steam discharge from the boiler interior, a filling over-flow means in communication with the boiler interior, a discharge pipe leading from said over-flow means to said catch-basin, a spring pressed valve to close said over-flow means, said valve serving when in closed position as a safety valve yieldable to excess steam pressure within the boiler body, means operating with said first mentioned valve to indicate the operative movements thereof, and means also operating with said first mentioned valve for raising said spring pressed valve to open position when the former is moved to water admission position.

9. A portable steam generator for the purposes described, comprising a boiler body having an enclosing heat insulating outer casing, an electrical heating means cooperating with the lower end of said boiler body and placed within said outer casing, an over-flow catch-basin connected with the lower end of said boiler body and its outer casing, a combined filling funnel and iron rest at the upper end of said outer casing, a valve means intermediate said boiler body and filling funnel manipulatable to establish at will either water intake communication between the latter and the former or steam discharge from the boiler interior, a filling over-flow means in communication with the boiler interior, a discharge pipe leading from said over-flow means to said catch-basin, a spring pressed valve to close said over-flow means, said valve serving when in closed position as a safety valve yieldable to excess steam pressure within the boiler body, means operating with said first mentioned valve to indicate the operative movements thereof, means also operating with said first mentioned valve for raising said spring pressed valve to open position when the former is moved to water admission position, and a vertically adjustable standard having a supporting plate at its upper end to receive and support said catch-basin and the boiler body connected therewith.

10. In a portable steam generator for the purposes described, a boiler body having electrical means for heating the same, a combined filling funnel and iron rest at the upper end of said boiler body, a rotatable two-way valve means intermediate said boiler body and filling funnel manipulatable at will to establish a water admission communication between said filling funnel and boiler body or steam discharge communication from the latter, a stem having handle means for manipulating said valve, a water level gauge having upper and lower tubular arms secured to and communicating with said boiler body, said water level gauge having a valve port at its upper end, a spring pressed valve normally closing said valve port, and means connected with said valve stem for raising said spring pressed valve to open position relative to said valve port when said first mentioned valve is moved to water admission relation to said boiler body.

11. In a portable steam generator for the purposes described, a boiler body having electrical means for heating the same, a combined filling funnel and iron rest at the upper end of said boiler body, a rotatable two-way valve means intermediate said boiler body and filling funnel manipulatable at will to establish a water admission communication between said filling funnel and boiler body or steam discharge communication from the latter, a stem having handle means for manipulating said valve, a water level gauge having upper and lower tubular arms secured to and communicating with said boiler body, said water level gauge having a valve port at its upper end, a spring pressed valve normally closing said valve port, means connected with said valve stem for raising said spring pressed valve to open position relative to said valve port when said first mentioned valve is moved to water admission relation to said boiler body, an indicator plate inscribed with indications designating the various positions of said first mentioned valve, and an indicating hand affixed to and actuated by said valve stem in cooperation with said indicator plate.

12. In a portable steam generator for the purposes described, a boiler body having electrical means for heating the same, a combined filling funnel and iron rest at the upper end of said boiler body, a rotatable two-way valve means intermediate said boiler body and filling funnel manipulatable at will to establish a water admission communication between said filling funnel and boiler body or steam discharge communication from the latter, a stem having handle means for manipulating said valve, a water level gauge having upper and lower tubular arms secured to and communicating with said boiler body, said water level gauge having a valve port at its upper end, means providing a discharge chamber above said valve port, a catch-basin affixed to and beneath said boiler body, a discharge pipe extending from said discharge chamber to said catch-basin, a spring pressed valve normally closing said valve port, and means connected with said valve stem for raising said spring pressed valve to open position relative to said valve port when said first mentioned valve is moved to water admission relation to said boiler body.

13. In a portable steam generator for the purposes described, a boiler body having electrical means for heating the same, a combined filling funnel and iron rest at the upper end of said boiler body, a rotatable valve two-way means intermediate said boiler body and filling funnel manipulatable at will to establish a water admission communication between said filling funnel and boiler body or steam discharge communication from the latter, a stem having handle means for manipulating said valve, a water level gauge having upper and lower tubular arms secured to and communicating with said boiler body, said water level gauge having a valve port at its upper end, means providing a discharge chamber above said valve port, a catch-basin affixed to and beneath said boiler body, a discharge pipe extending from said discharge chamber to said catch-basin, a spring pressed valve normally closing said valve port, means connected with said valve stem for raising said spring pressed valve to open position relative to said valve port when said first mentioned valve is moved to water admission relation to said boiler body, and a vertically adjustable standard having a supporting plate at its upper end to receive and support said catch-basin and the boiler body connected therewith.

In testimony, that I claim the invention set forth above I have hereunto set my hand this 22nd day of April, 1925.

CHARLES A. BREWER.